United States Patent [19]
Anderson, Jr.

[11] Patent Number: 6,013,956
[45] Date of Patent: Jan. 11, 2000

[54] TOUCH CONTROL SWITCHES FOR VEHICLES

[75] Inventor: James Burr Anderson, Jr., Cookeville, Tenn.

[73] Assignee: Cooper Automotive Products, Inc., Houston, Tex.

[21] Appl. No.: 09/027,809

[22] Filed: Feb. 23, 1998

[51] Int. Cl.[7] ................................ H01K 7/00; B60L 1/14
[52] U.S. Cl. ..................... 307/10.1; 315/77; 307/10.8; 307/116; 362/490
[58] Field of Search ...................... 307/9.1, 10.1, 307/10.8, 116; 200/5 A, 512, 513, 517, 313, 314, 341, 302.1, 302.2; 340/458, 459, 461; 315/77, 82, 84; 362/464, 471, 479, 482, 487–490; 361/179; 701/1, 29, 36, 49; 345/173

[56] References Cited

U.S. PATENT DOCUMENTS

| | | |
|---|---|---|
| 3,973,140 | 8/1976 | Phillips . |
| 4,742,327 | 5/1988 | Burgess et al. . |
| 4,787,040 | 11/1988 | Ames et al. . |
| 5,212,643 | 5/1993 | Yoshida . |
| 5,311,302 | 5/1994 | Berry et al. . |
| 5,404,443 | 4/1995 | Hirata . |
| 5,467,080 | 11/1995 | Stoll et al. . |
| 5,539,429 | 7/1996 | Yano et al. . |
| 5,588,673 | 12/1996 | Green et al. . |
| 5,635,925 | 6/1997 | Kishi et al. . |
| 5,784,036 | 7/1998 | Higuchi et al. ........................ 345/173 |
| 5,805,402 | 9/1998 | Maue et al. ........................... 307/10.1 |

*Primary Examiner*—Richard T. Elms
*Attorney, Agent, or Firm*—Fish & Richardson P.C.

[57] ABSTRACT

A touch panel for controlling a vehicle function includes a panel installed in a vehicle and a thin film switch disposed on the surface of the panel. The thin film switch is configured to control a vehicle function. The touch panel also may have a thin film range switch disposed on the surface of the panel. The range switch is configured to vary a setting of the vehicle function.

25 Claims, 6 Drawing Sheets

TOUCH CONTROL SWITCHES FOR VEHICLES

BACKGROUND

The invention relates to touch control switches. Touch control switches, such as touch buttons, thin film buttons or membrane buttons have been used on manufacturing equipment, test equipment, consumer appliances and other applications.

SUMMARY

In one aspect, a dome lamp for a vehicle includes a base configured to mount on the ceiling of the vehicle and configured to accept a light source. A cover is disposed over the base and a thin film switch disposed across a portion of the cover.

Embodiments of the dome lamp may include one or more of the following features. The thin film switch may include an ON button configured to activate the light source, an OFF button configured to deactivate the light source, and a DOOR button configured to activate the light source when a door of the vehicle is opened. The buttons of the thin film switch may be backlit by LEDs. The thin film switch may include a button for activating a map light.

A thin film dimmer switch configured to vary an intensity setting of the light source may be disposed across the cover. An LED bar graph configured to illuminate in response to the intensity setting of the light source may be positioned adjacent to the dimmer switch. An LED bar graph also may be positioned beneath the dimmer switch and configured to back light the dimmer switch in response to the intensity setting of the light source.

The dome lamp may include a dome light, a map light, and a thin film dimmer switch disposed across the cover. The thin film dimmer switch may be configured to vary an intensity setting of the map light. An LED bar graph may be positioned adjacent to the dimmer switch and may be configured to illuminate in response to the intensity setting of the map light.

The touch control dome lamp provides several advantages over traditional dome lamp designs. For example, the touch control dome lamp provides light for vehicle occupants using traditional incandescent lamps, while allowing occupants to dim or brighten the lamps as needed. The dome lamp may include a delay timer to dim and shut off the lamps after the vehicle door has been closed for a specified time period, which helps prevent excessive drain on the battery.

In another aspect, generally, a touch panel for controlling a vehicle function includes a panel installed in a vehicle. A thin film switch is disposed on the surface of the panel and is configured to control a vehicle function.

Embodiments may include one or more of the following features. The touch panel may include a thin film range switch disposed on the surface of the panel and configured to vary a setting of the vehicle function across a range of values. An LED bar graph configured to illuminate in response to the setting of the vehicle function may be positioned adjacent to the range switch. The LED bar graph also may be configured to back light the range switch in response to the setting of the vehicle function and may be positioned beneath the dimmer switch.

The touch panel may include a second thin film switch disposed on the surface of the panel that is configured to control a second vehicle function. A SELECT button may be configured to select a vehicle function and to allow a setting of the selected vehicle function to be varied.

The vehicle function referred to above may be an interior light, exterior light, stereo control, or environmental control. The stereo control may be a volume control or a tuner frequency control. The environmental control may be a ventilation system temperature control or a fan speed control.

In another aspect, the touch panel for controlling a vehicle function includes a panel installed in a vehicle and a thin film range switch disposed on the surface of the panel and configured to vary a setting of the vehicle function.

Embodiments of the panel may include one or more of the following features. A thin film switch may be configured to activate or deactivate the vehicle function. An LED bar graph configured to illuminate in response to the setting of the vehicle function may be positioned adjacent to beneath the range switch.

In another aspect, a touch panel for controlling a vehicle function may include a panel installed in a vehicle and a thin film switch disposed on the surface of the panel and configured to vary a setting of the vehicle function. The thin film switch may be divided into a portion configured to increase the setting and a portion configured to decrease the setting.

Touch control panels for vehicle lighting and other control functions provide several advantages. For example, the touch control panels present an aesthetically pleasing, aerodynamic appearance that is well-suited for modern vehicle styling. Touch control panels also allow greater flexibility in automotive interior design, since controls may be positioned in many different locations, such as flip-open panels or pop-out drawers.

Other features and advantages will be apparent from the following description, including the drawings, and from the claims.

DESCRIPTION

Figure 1:
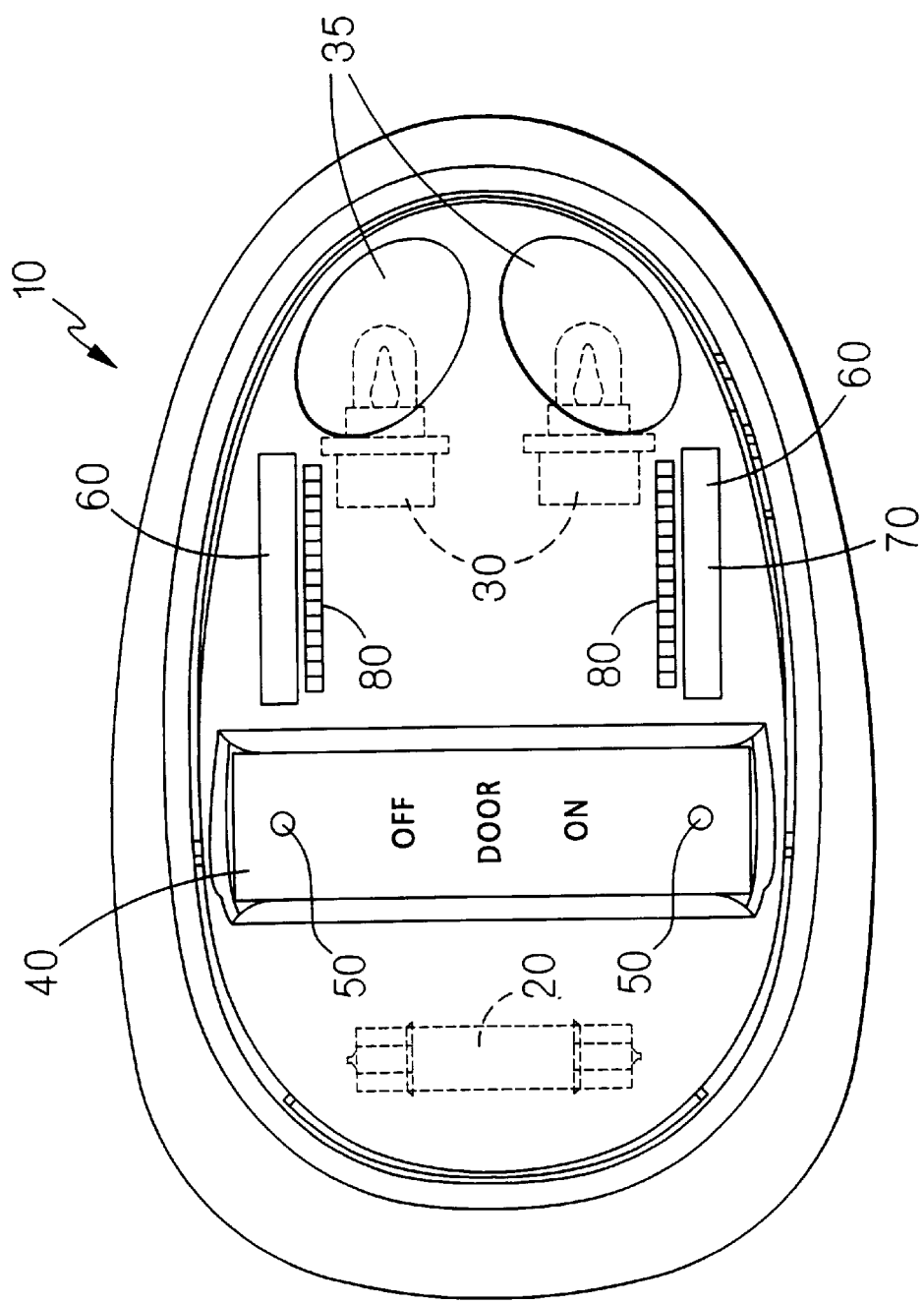
FIG. 1 is a plan view of a vehicle dome lamp with touch controls.
Figure 2:
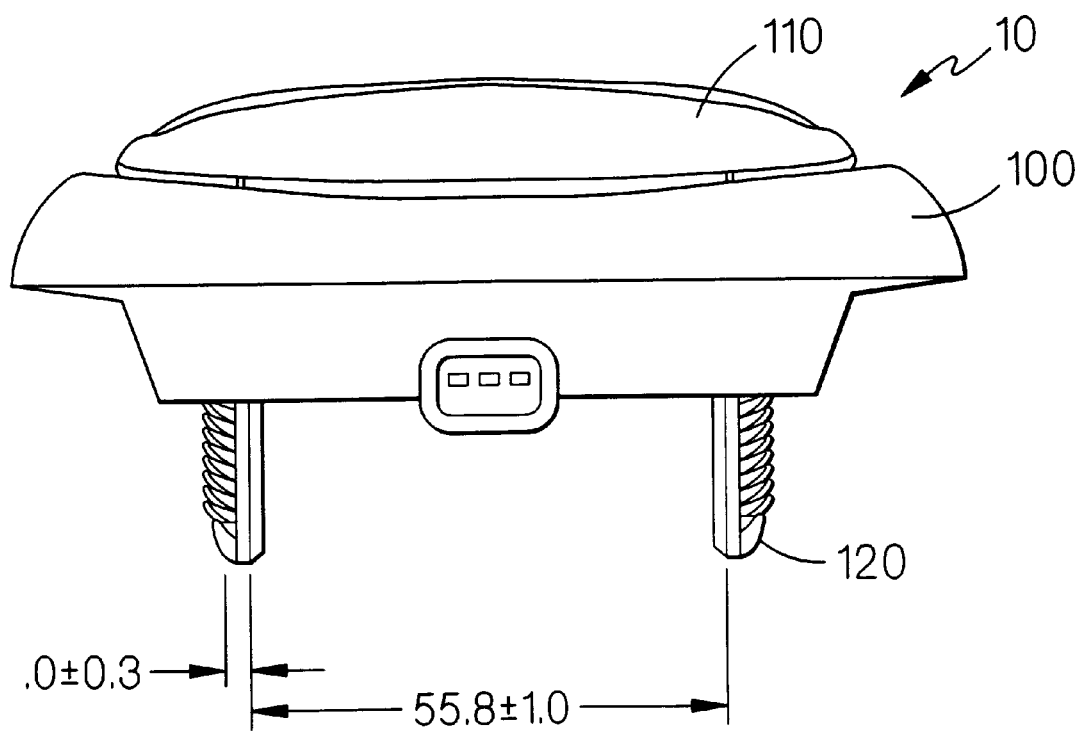
FIG. 2 is a side view of the vehicle dome lamp of FIG. 1.

FIGS. 1 and 2 show a dome lamp 10 with touch button controls. The dome lamp 10 has a base 100 in which the electronic components and light sources are mounted and a transparent plastic cover 110. Mounting snaps 120 provided on the underside of the base 100 permit mounting of the lamp 10 in the vehicle.

An incandescent cartridge 20 in the rear section of the dome lamp 10 provides primary illumination. Two incandescent bulbs 30 at the left and right sides of the front section of the dome lamp provide driver and passenger side map lights. Lenses 35 are formed in the cover 110 to improve the beam pattern of the map lights.

A rectangular thin film switch 40 having five buttons extends across the central portion. The thin film switch 40 may be constructed of two pieces of metalized plastic adhered to one another with a separation of approximately 0.1 mm. The thin film switch may be recessed approximately 0.2 mm from the surface. Alternatively, a membrane switch may be used.

The individual thin film buttons arrayed on the thin film switch are backlit with LEDs. The thin film buttons provide control for the dome light and map lights. The "ON", "OFF" and "DOOR" buttons turn the dome light on and off or cause it to automatically activate when a door is opened. The buttons 50 at the ends of the thin film switch toggle the map lights on and off.

The map lights also are controlled by dimmer touch buttons 60 positioned on the sides of the dome lamp 10 between the thin film switch 40 and the map light bulbs 30. The dimmer buttons 60 control the map lights in a number of ways. First, touching a dimmer button 60 at a point along its length will activate the corresponding map light with an intensity that is proportional to the position of the point touched relative to the end of the dimmer button 60. For example, touching a dimmer button 60 at its mid-point 70 will activate the map light at half power. Second, running one's finger along the length of a dimmer button 60 will dim or brighten the map light depending upon the direction moved.

A row of LEDs 80 is positioned parallel to each dimmer button 60. The LEDs 80 illuminate in response to the dimming level and act as a bar graph indicator of the map light setting. For example, if a map light is set for half-power, then half of the LEDs 80 will be illuminated. The LEDs are illuminated only when the map light is turned on. Alternatively, the LEDs 80 may be positioned beneath the dimmer button 60 and may act as a back light.

Figure 3:
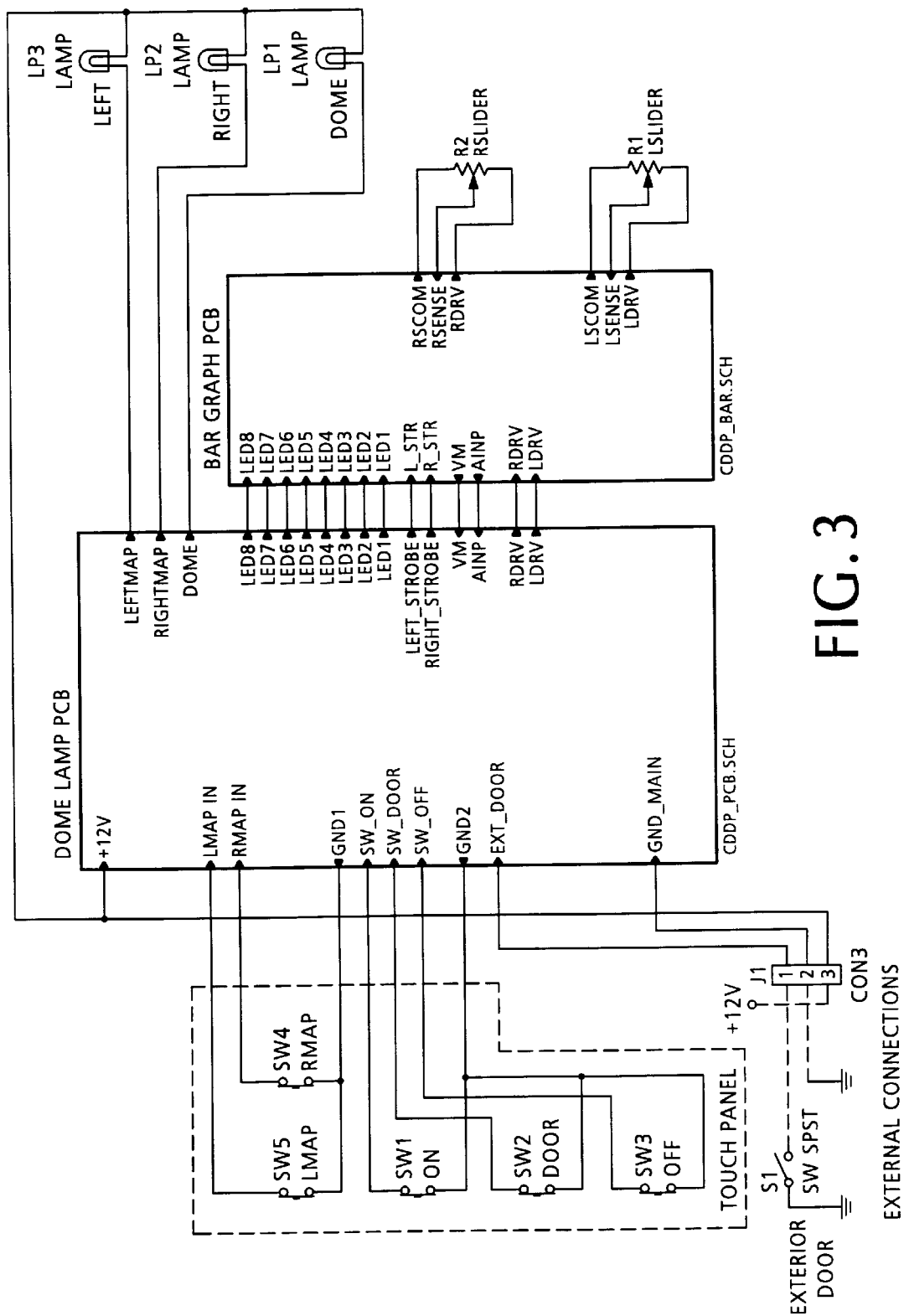
FIG. 3 is a circuit diagram of the vehicle dome lamp of FIG. 1.

FIG. 3 shows a circuit diagram for the dome lamp. The circuit includes two printed circuit boards (PCB): the dome lamp PCB (or main board) and the bar graph PCB. The main board receives input signals (LMAP IN, RMAP IN, SW_ON, SW_OFF, SW_DOOR) from the five thin film buttons 40. The main board receives an input (EXT_DOOR) from the vehicle doors that indicates whether the doors are open or closed. There are also power and ground inputs (+12V and GND_MAIN) from the vehicle electrical system.

The main board provides power to the map lights and dome lights (LEFTMAP, RIGHTMAP, DOME) and also provides driving signals (LED1–LED8) to the bar graph PCB to activate the LEDs 80. The LED driving signals (LED1–LED8) are shared by the left and right map light LEDs in order to reduce the complexity of the connection between the main board and bar graph PCB. The main board alternately provides LED driving signals for the left and right map lights while alternately activating the corresponding strobe signal (LEFT_STROBE, RIGHT_STROBE). In addition, the main board includes LEDs to backlight the thin film buttons 40.

The bar graph PCB includes LEDs 80 to indicate the left and right map light settings. The bar graph PCB also sends driving signals (LDRV, RDRV) to the map dimmer buttons 60 and receives sense signals (LSENSE, RSENSE) from the dimmer buttons. The sense signals are output to the main board to control the power output to the map lights.

Figure 4:
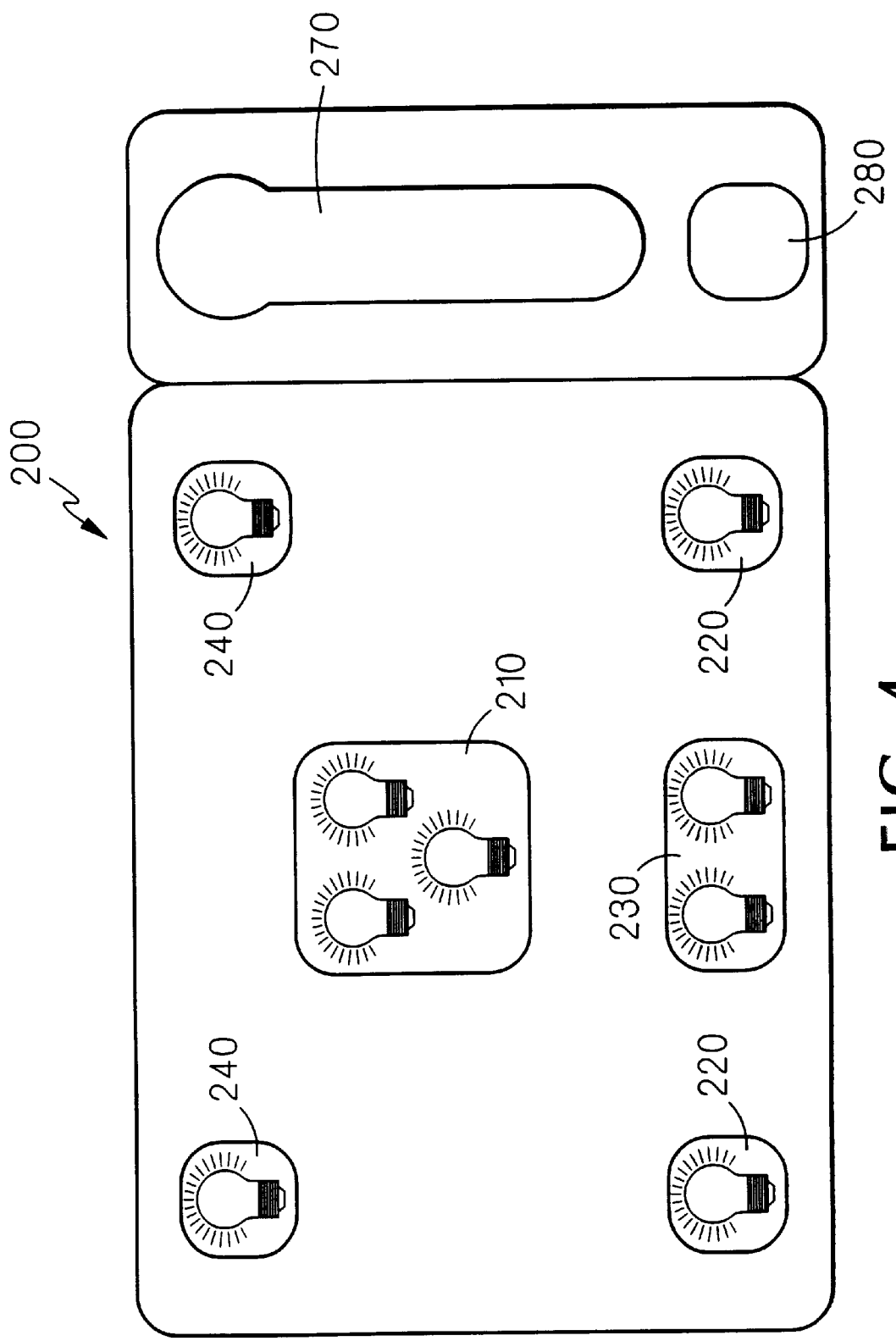
FIG. 4 is a diagram of a touch panel to control vehicle interior lighting functions.

Touch control buttons also may be used to control other lighting functions within the vehicle. For example, FIG. 4 shows a panel 200 that includes touch buttons to control various interior lighting functions. The interior lighting functions may include a dome light 210, forward courtesy lights 220, map lights 230 and rear courtesy lights 240. These interior lights may be turned on, turned off, dimmed and brightened by simply pressing the touch buttons.

After pressing a particular touch button, such as the dome light button 210, a dimmer button 270 positioned along one side of the panel 200 may be used to dim or brighten the activated lighting function. A "SELECT" button 280 may be included to allow a lighting function to be adjusted without inadvertently turning the light on or off. For example, the SELECT button 280 may be pressed prior to pressing the dome light button 210. The dimmer 270 may then be used to adjust the dome lamp level. In this manner, the interior lighting functions can be adjusted to desired levels.

The panel 200 may be positioned on the dashboard or on the center of the steering wheel. Alternatively, the panel 200 may be hidden, e.g., mounted in the center console or in the ceiling, and may flip open to reveal the controls. The panel may also slide out like a drawer, in a manner similar to the tray of a CD player.

Figure 5:
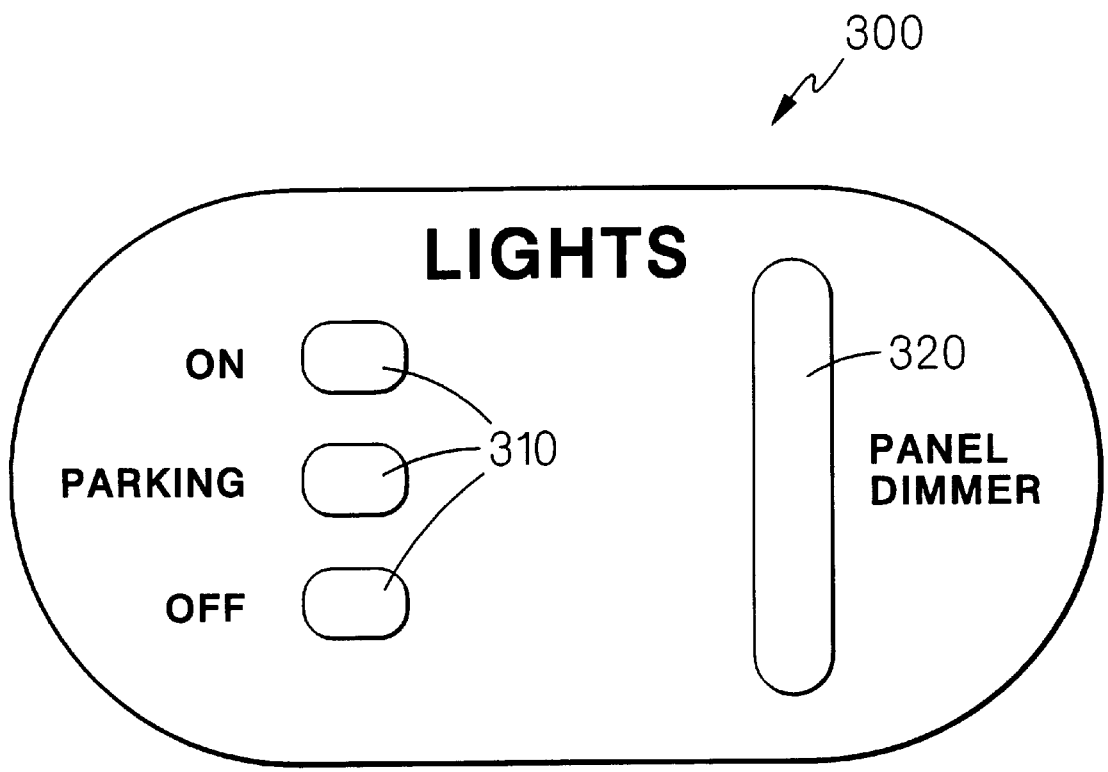
FIG. 5 is a diagram of a touch panel to control vehicle exterior and dashboard lighting functions.

FIG. 5 shows a panel 300 that includes touch buttons to control the exterior lighting functions. The headlights or parking lights are turned on and off with touch buttons 310. In addition, a dimmer button 320 brightens or dims the interior dashboard lighting.

Figure 6:
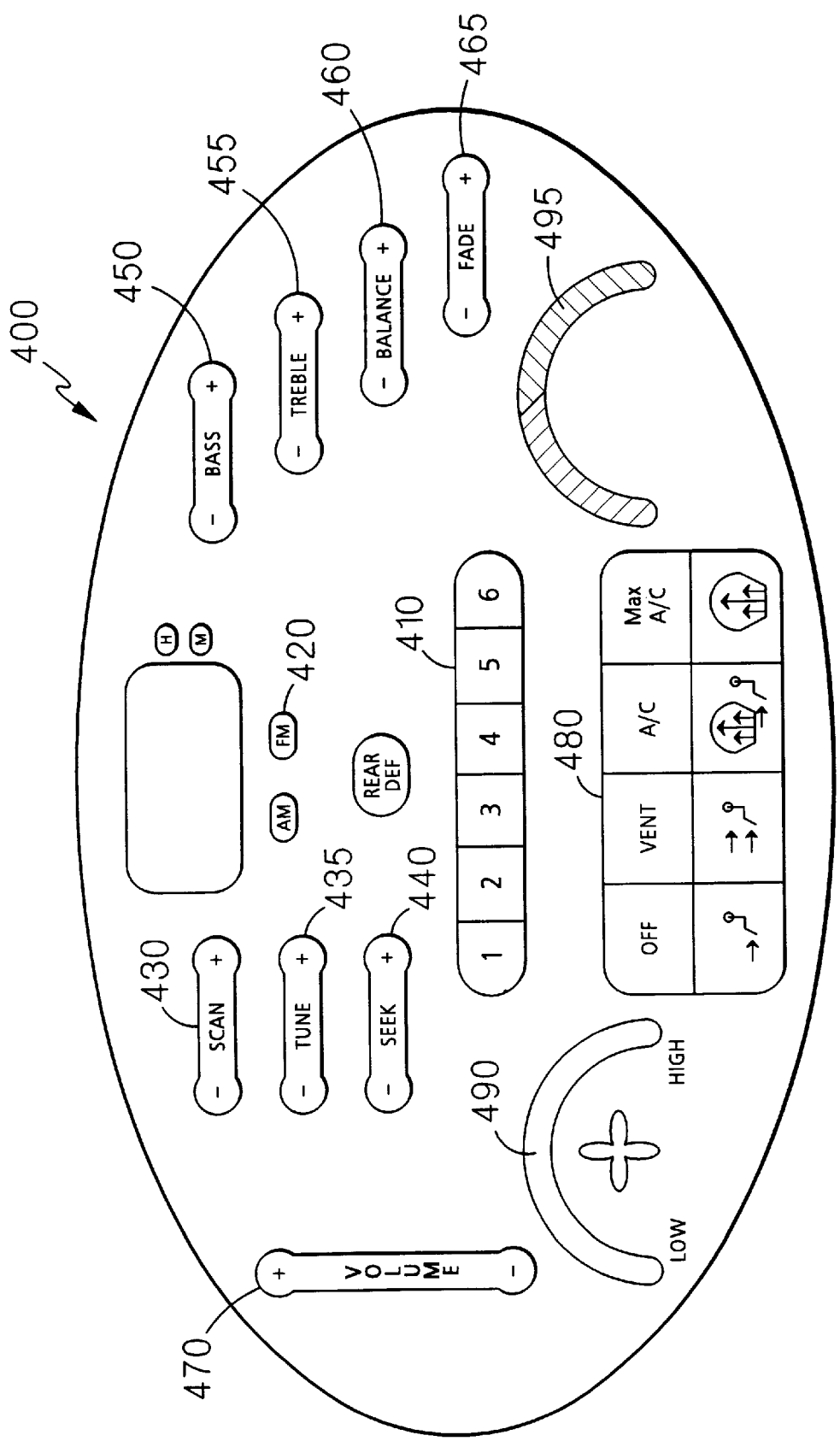
FIG. 6 is a diagram of a touch panel to control vehicle environmental functions.

Vehicle controls other than lighting functions may also be controlled with touch buttons. For example, FIG. 6 shows a panel 400 that is used to control vehicle environmental functions, such as air conditioning, heating, defrost, clock and stereo.

Certain functions of the stereo system are controlled by touch buttons having a single operative portion, such as pre-set station 410 and AM/FM 420 selection. The SCAN 430, SEEK 435 and TUNE 440 functions of the receiver are controlled by touch buttons having two operative portions (designated − and +) that determine the direction in which the desired function is performed, e.g., the direction of decreasing or increasing frequency. The controls for BASS 450, TREBLE 455, BALANCE 460, FADE 465 and VOLUME 470 operate similarly. Alternatively, the touch buttons for these functions may be range buttons that operate like the dimmer button of the dome lamp described above (FIG. 1, ref. no. 60), i.e., the buttons may be pressed at any point along their length to set a desired level. For example, the balance button 460 may be pressed at its midpoint to balance the output equally between the left and right speakers. As in the dome lamp, a row of LEDs may be positioned parallel to the touch button to indicate the current level setting, or a row of LEDs may be used as a backlight for the button.

The ventilation system is controlled by touch buttons 480 that turn the air conditioning on and off and select the vents to which the air flow is directed. The fan speed is controlled by pressing a range touch button 490 at any point along its length. Likewise, the temperature control 495 may be pressed at any point along its length to set a desired level. The temperature control 495 may be backlit with colored LEDs (e.g., blue and red) or may have a row of LEDs positioned along its length.

The use of touch buttons to control vehicle lighting and other functions provides several advantages. For example, because touch buttons generally require less depth for installation than mechanical switches, touch buttons may be placed in locations that may not be practical for mechanical switches, such as the center of the steering wheel over the airbag enclosure. Touch buttons also provide more flexibility to achieve aesthetically pleasing interior design effects, since touch buttons can be formed in a variety of shapes and sizes. Touch buttons also provide a flat, smooth control surface that is easier to clean.

Other embodiments are within the scope of the following claims.

What is claimed is:

1. A dome lamp for a vehicle, comprising:
   a base configured to mount on the ceiling of the vehicle and configured to accept a light source,
   a cover disposed over the base, and
   a thin film switch disposed across a portion of the cover.

2. The dome lamp of claim 1, wherein the thin film switch comprises:
   an ON button configured to activate the light source,
   an OFF button configured to deactivate the light source, and
   a DOOR button configured to activate the light source when a door of the vehicle is opened.

3. The dome lamp of claim 2, wherein the buttons of the thin film switch are backlit by LEDs.

4. The dome lamp of claim 2, wherein the thin film switch further comprises a button for activating a map light.

5. The dome lamp of claim 1, further comprising a thin film dimmer switch disposed across the cover, the dimmer switch being configured to vary an intensity setting of the light source.

6. The dome lamp of claim 5, further comprising an LED bar graph configured to illuminate in response to the intensity setting of the light source.

7. The dome lamp of claim 6, wherein the LED bar graph is positioned beneath the dimmer switch and configured to back light the dimmer switch in response to the intensity setting of the light source.

8. The dome lamp of claim 1, further comprising:
   a dome light,
   a map light,
   a thin film dimmer switch disposed across the cover, the dimmer switch being configured to vary an intensity setting of the map light, and
   an LED bar graph configured to illuminate in response to the intensity setting of the map light.

9. A touch panel for controlling a vehicle function, comprising:
   a panel installed in a vehicle;
   a thin film switch disposed on the surface of the panel, the thin film switch configured to control a vehicle function; and
   a thin film range switch disposed on the surface of the panel, the range switch configured to vary a setting of the vehicle function between more than two settings.

10. The touch panel for controlling a vehicle function of claim 9, further comprising an LED bar graph positioned adjacent to the range switch, the bar graph configured to illuminate in response to the setting of the vehicle function.

11. The touch panel for controlling a vehicle function of claim 9, further comprising an LED bar graph positioned beneath the range switch, the bar graph configured to back light the range switch in response to the setting of the vehicle function.

12. The touch panel for controlling a vehicle function of claim 9, further comprising:
   a second thin film switch disposed on the surface of the panel, the second thin film switch configured to control a second vehicle function, and
   a SELECT button configured to select a vehicle function and to allow a setting of the selected vehicle function to be varied.

13. The touch panel for controlling a vehicle function of claim 9, wherein the vehicle function is an interior light.

14. The touch panel for controlling a vehicle function of claim 9, wherein the vehicle function is an exterior light.

15. The touch panel for controlling a vehicle function of claim 9, wherein the vehicle function is a stereo control.

16. The touch panel for controlling a vehicle function of claim 15, wherein the stereo control is a volume control.

17. The touch panel for controlling a vehicle function of claim 15, wherein the stereo control is a tuner frequency control.

18. The touch panel for controlling a vehicle function of claim 9, wherein the vehicle function is an environmental control.

19. The touch panel for controlling a vehicle function of claim 18, wherein the environmental control is a ventilation system temperature control.

20. The touch panel for controlling a vehicle function of claim 18, wherein the environmental control is a fan speed control.

21. A touch panel for controlling a vehicle function, comprising:
   a panel installed in a vehicle, and
   a thin film range switch disposed on the surface of the panel and configured to vary a setting of the vehicle function between more than two settings.

22. The touch panel for controlling a vehicle function of claim 21, further comprising:
   a thin film switch configured to activate the vehicle function, and
   a thin film switch configured to deactivate the vehicle function.

23. The touch panel for controlling a vehicle function of claim 21, further comprising an LED bar graph configured to illuminate in response to the setting of the vehicle function.

24. The touch panel for controlling a vehicle function of claim 23, wherein the LED bar graph is positioned beneath the range switch to back light the range switch in response to the setting of the vehicle function.

25. A touch panel for controlling a vehicle function, comprising:
   a panel installed in a vehicle, and
   a thin film switch disposed on the surface of the panel and configured to vary a setting of the vehicle function,
   wherein the thin film switch is divided into a portion configured to increase the setting and a portion configured to decrease the setting.

* * * * *